Jan. 14, 1969 G. MARTIN 3,422,284

OR TYPE FAIL-SAFE LOGIC CIRCUIT

Filed Jan. 5, 1965

INVENTOR
GÉRARD MARTIN
BY
Bacon & Thomas
ATTORNEYS

United States Patent Office 3,422,284

Patented Jan. 14, 1969

3,422,284

OR TYPE FAIL-SAFE LOGIC CIRCUIT

Gérard Martin, Villemomble, France, assignor to Societe Anonyme dite Compagnie des Freins et Signaux Westinghouse, Paris, France Filed Jan. 5, 1965, Ser. No. 423,522

Claims priority, application France, Jan. 8, 1964, R.V. 959,625

U.S. Cl. 307—218 1 Claim

Int. Cl. H03k *19/22;* H03k *19/30*

ABSTRACT OF THE DISCLOSURE

And OR type fail-safe logic circuit producing an operating periodic output signal in relationship with at least one of at least two control periodic input signals, comprising a component such as a transistor whose output circuit supplies the operating periodic output signal and whose input circuit is connected in parallel to the output circuits of at least two control circuits, each of the control circuits comprising at least one resistor, and the input circuits of the control circuits being respectively connected to the sources generating the control periodic input signals.

The safety conditions for industrial installations in general, and for railway traffic control in particular, require reliable control means. It is important that in the event of a failure of any one of the components of a particular functional unit, the emitted output signal of this unit is or becomes such that the information transmitted is the most restrictive, that is to say is always in the direction of safety required for the given installation.

In particular, the OR semi-conductor logical circuits actually produced and used for example in logical treatment of information, suffer the disadvantage that in the event of a short circuit or of an accidental breakdown of a component, for example a transistor, the output information gives rise to a signal which cannot be distinguished from that produced respectively by the states of conduction or non-conduction of the transistor considered, said states being determined in normal operation by the input signal applied to the circuit.

It is an object of the present invention to overcome these disadvantages and the present invention provides an OR type fail-safe logic circuit which is totally secure.

Figure 1:
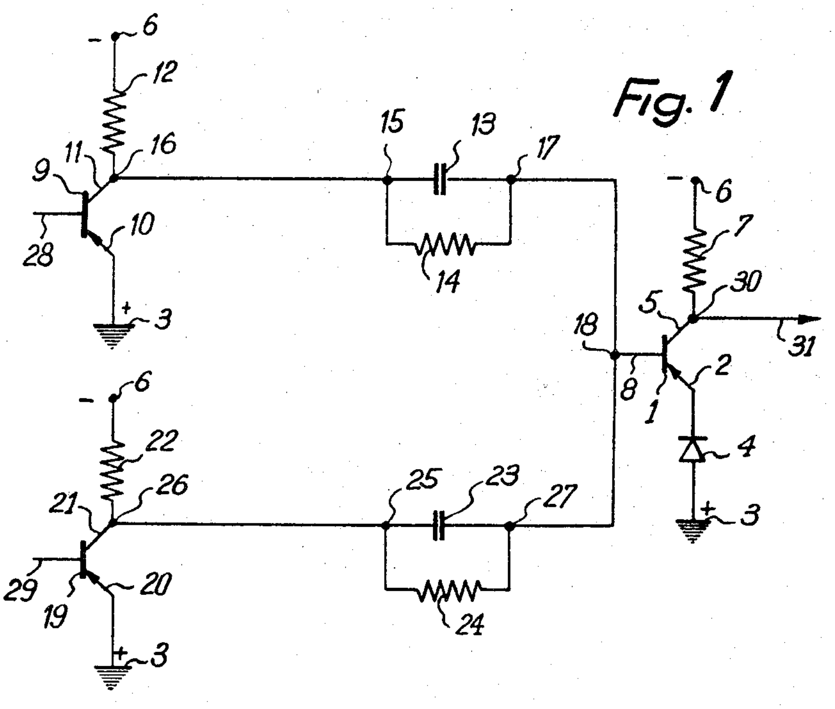
Figure 2:
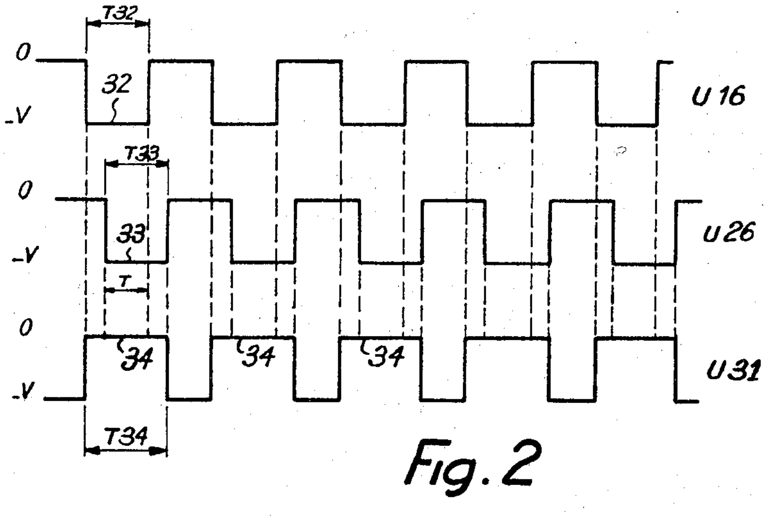

The invention will be now described, by way of a non-limitative example, with reference to the accompanying drawings in which:

FIGURE 1 shows the electrical circuit of a fail-safe OR gate according to one embodiment of the invention, FIGURE 2 shows the relationship of the voltage curves at various points of the circuit shown in FIGURE 1.

As shown in FIGURE 1, the logic circuit according to the invention comprises a transistor 1, of the type PNP, whose emitter 2 is coupled to the positive terminal 3 of a source of electrical direct current, not shown in the figure, through a diode 4.

The diode 4 is connected to allow the current to pass in the direction terminal 3–emitter 2.

The collector 5 is coupled to the negative terminal 6 of the source of electrical direct current, through a resistance 7.

The OR gate of the FIGURE 1 comprises, two substantially identical control circuits connected to the base 8 of the transistor 1.

The first control circuit is formed by a transistor 9, of the type PNP, whose emitter 10 is coupled to the positive terminal 3 of the source of electrical direct current, and whose collector 11 is coupled to the negative terminal 6 of the said source, through a resistor 12.

A capacitor 13 is connected in parallel with a resistor 14. The terminal 15 common to these two elements is coupled to the terminal 16 of the collector 11.

The other terminal 17 common to the capacitor 13 and to the resistor 14 is coupled to the terminal 18 of the base 8 of the transistor 1.

The second control circuit comprises a transistor 19 whose emitter 20 is coupled to the positive terminal 3 of the source of electrical current, and whose collector 21 is coupled to the negative terminal 6 of the said source, through a resistor 22.

A capacitor 23 is connected in parallel with a resistor 24. One of the terminals 25 common to these two elements is coupled to the terminal 26 of the collector 21 of the transistor 19.

The other terminal 27 common to the capacitor 23 and to the resistor 24, is coupled to the terminal 18 of the base 8 of the transistor 1.

The capacitors 13 and 23 allow the duration of the proper time response of transistor 1 to be reduced. If quick-acting transistors are used, the capacitors 13 and 23 are not necessary.

The diode 4 ensures that the transistor 1 is nonconductive at elevated temperatures.

The two input signals to be treated are respectively supplied to the base 28 of the transistor 9 of the first control circuit and to the base 29 of the transistor 19 of the second control circuit.

The input signals supplied to the bases 28 and 29 have the same frequency, their amplitude being chosen so as to obtain square wave signals with an amplitude equal to —V, at the terminals 16 and 26 of the collectors of these transistors.

The output signal of the gate is collected at the terminal 30 of the collector 5 of the transistor 1, and is transmitted through the conductor 31.

This conductor 31 may be coupled to an amplifier stage, constituted for instance by a transistor, so as to obtain a constant output signal.

The input signal applied to the base 28 has, after having passed through the transistor 9, the wave form shown in the FIGURE 2 by the voltage curve U16 that corresponds to the signal at the terminal 16.

Likewise, the input signal applied to the base 29 has, after having passed through the transistor 19, the wave form shown in the FIGURE 2 by the voltage curve U26 that corresponds to the signal at the terminal 26.

If the control signals represented by the wave forms U16 and U26 are simultaneously at a potential equal to 0, the base 8 of the transistor 1 is at a potential equal to 0. The transistor 1 is non-conductive and the voltage, at the terminal 30 of the collector 5, is equal to the potential of the terminal 6 of the source of direct current, that is to say to the potential —V, V being the value of the voltage of the said source.

If any one of the terminals 16 and 26 is at a negative potential, say at the potential —V in the described embodiment, the base 8 of the transistor 1 is also at the potential —V, the transistor 1 is conducting and the value of the potential at the output 31 is practically equal to 0, as shown in FIGURE 2.

The resistors 14 and 24, the capacitors 13 and 23 and the characteristics of the transistor 1 are so chosen that the transistor 1 is kept in cut-off state when the signals represented by the curves U16 and U26 are simultaneously at the potential 0, and in conduction state when the potential of one of these signals is equal to —V.

The control signals represented by the curves U16 and U26 have the same frequency, but one of them may be out of phase with respect to the second, as shown in FIGURE 2.

In brief: a periodic signal appearing at the points 16 or 26 corresponds to the presence of a periodic signal on the bases of the transistors 9 or 19 and thus to a periodic signal transmitted through the conductor 31; in the following description, such a situation is referred to as the "state 1" of the circuit.

If there are no periodic signals on the bases of the transistors 9 and 19, the potentials at the points 16 and 26 are equal to —V; the transistor 1 is conducting and the signal transmitted through the conductor 31 is a continuous signal practically equal to 0; such a situation is referred to as the "state 0" of the circuit; but, in some cases, the "state 0" may correspond to the cut-off position of the transistor 1, the conductor 31 being therefore at the potential —V; it is only the presence of a periodic signal on the conductor 31 that expresses the fact that the circuit is in the state 1.

The following sets out the different faults which may affect the components of the gate, and indicates the state of the circuit in each case.

In the event of an internal disconnection or of an internal short circuit affecting the transistor 9, the signal applied to the base 28 of the transistor 9 is not transmitted and the corresponding control circuit is in the state 0 (no input signal).

It is the same for an internal disconnection or an internal short circuit affecting the transistor 19.

If faults appear simultaneously in both the transistors, the control circuits transmit no signal and the final output signal is in the state 0, which provides the required safety condition.

In the same manner, the disconnection of the conductors connecting the terminal 16 to the base 8 of the transistor 1, corresponds to the state 0: no periodic input signal.

The disconnection of the conductors connecting the terminal 26 to the base 8 of the transistor 1, corresponds to state 0; no periodic input signal.

If said conductors are simultaneously disconnected, the final output signal appearing at the terminal 30 is in the state 0, which is the required condition of safety.

An internal disconnection of the transistor 1 results in a negative potential —V at the terminal 30, which corresponds to a state 0, i.e. no periodic output signal.

In case of a short circuit in the transistor 1, the terminal 30 is at the earth potential, which corresponds to the state 0, i.e. no periodic output signal.

The disconnection of the resistor 7 causes the disappearance of the signal at the collector 5 of the transistor 1 which corresponds to the state 0, i.e. no periodic output signal.

The short circuit of the resistance 7 reduces to zero the current through the collector 5 of the transistor 1, there is no possibility of transmitting the periodic signal which corresponds to the state 0.

The disconnection of the capacitor 13 or of the capacitor 23 does not give rise to a wrong signal, but only to a slower response of the OR gate. Such a possibility is eliminated if the transistor 1 is a quick-acting transistor.

The short circuit of the capacitors 13 or 23 causes the disappearance of the corresponding periodic input signal for in said case the collector of either of the transistor 9 or the transistor 19 is short-circuited by the emitter-base diode of the transistor 1.

The short circuit of both the capacitors 13 and 23 corresponds to the state 0 (no periodic output signal).

The disconnection of the resistances 14 or 24 causes the disappearance of the input signal in the corresponding control circuit.

If the resistors 14 and 24 are simultaneously disconnected, no input signal appears at the base 8 of the transistor 1 which corresponds to the state 0.

The short circuit of the resistor 14 or of the resistor 24 causes the disappearance of the corresponding input signal for, in said case, the collector of the transistor 9 or of the transistor 19 is short-circuited by the emitter-base diode of the transistor 1.

If the transistors 9 and 19 are both short-circuited, the gate does not supply any periodic signal (state 0) which provides the required condition of safety.

In the described embodiment, only two control circuits have been considered. It is clear that the OR gate can be used with any number of control circuits whose components satisfy the same relations, if the input signals are of the same frequency.

In other respects, in the described embodiment, the transistors are of the type PNP. The gate can also be formed with transistors of the type NPN. It is then sufficient to reverse the terminals of the source of direct electrical current, and to change the connections of the diode 4.

It is well understood that the invention is not limited to the described embodiment, but that it can be modified within the scope of the appended claim, in particular as for the form of the input signals, the number of control circuits and the composition of the output circuit of the gate.

What is claimed is:

1. A fail-safe OR gate which delivers an output signal corresponding to a position of the greatest safety in case of accidental disturbance of one of its components, comprising;
   - a pair of semiconductors having input and output circuits connected in parallel, said input circuits being responsive to independent input signals;
   - impedance means in each of said output circuits of said pair of semiconductors; and
   - a third semiconductor whose input circuit is connected to said parallel output circuits, said third semiconductor being energized through a diode; said output circuit of said third semiconductor providing an output signal only when an input signal is received by either or both of said pair of semiconductors.

References Cited

UNITED STATES PATENTS

| | | | |
|---|---|---|---|
| 3,027,465 | 3/1962 | DiLorenzo et al. | 307—88.5 X |
| 3,105,923 | 10/1963 | Rose et al. | 307—88.5 X |

OTHER REFERENCES

Epsco, Incorporated, "Transistor Parallel Gate," July 1958, copy in Group 254, Class 307/218.

ARTHUR GAUSS, *Primary Examiner.*

ROBERT H. PLOTKIN, *Assistant Examiner.*

U.S. Cl. X.R.

328—92